United States Patent [19]

Lormeau et al.

[11] Patent Number: 4,990,502

[45] Date of Patent: Feb. 5, 1991

[54] LOW MOLECULAR WEIGHT HEPARINS OF REGULAR STRUCTURE, THEIR PREPARATION AND THEIR BIOLOGICAL USES.

[75] Inventors: Jean-Claude Lormeau, Maromme; Maurice Petitou, Paris Cedex; Jean Choay, Paris, all of France

[73] Assignee: Sanofi, S.A., Paris, France

[21] Appl. No.: 181,969

[22] Filed: Apr. 15, 1988

[30] Foreign Application Priority Data

Apr. 16, 1987 [FR] France ............................ 87 05457

[51] Int. Cl.$^5$ ...................... A61K 31/725; C08B 37/10
[52] U.S. Cl. ......................................... 514/56; 536/21; 536/55.3; 536/124
[58] Field of Search .............. 514/56.54; 536/21, 55.3, 536/124

[56] References Cited

U.S. PATENT DOCUMENTS

| | | | |
|---|---|---|---|
| 4,303,651 | 12/1981 | Lindahl et al. | 514/56 |
| 4,496,550 | 1/1985 | Lindahl et al. | 514/56 |
| 4,533,549 | 8/1985 | Lasker | 514/56 |
| 4,629,699 | 12/1986 | Bianchni | 536/21 |
| 4,687,765 | 8/1987 | Vairel et al. | 514/56 |
| 4,745,106 | 5/1988 | Griffin et al. | 514/56 |
| 4,777,161 | 10/1988 | Lormeau et al. | 514/56 |
| 4,788,307 | 11/1988 | Lormeau et al. | 536/21 |
| 4,791,195 | 12/1988 | Bianchini et al. | 536/21 |
| 4,801,583 | 1/1989 | Petitou et al. | 514/54 |
| 4,804,652 | 2/1989 | Lormeau et al. | 514/56 |
| 4,826,827 | 5/1989 | Lormeau et al. | 514/56 |

FOREIGN PATENT DOCUMENTS

| | | | |
|---|---|---|---|
| 8001383 | 5/1980 | European Pat. Off. | 37/10 |
| 208623 | 7/1981 | European Pat. Off. | |

OTHER PUBLICATIONS

Perlin et al.; Canadian Journal of Chemistry 48:2260–2268 (1970).
Fransson et al.; Febs. Letters 97(1):119–123 (1979).
Sy et al.; Cellular Immunology 82:23–32 (1983).
Casu; Advances in Carbohydrate Chemistry and Biochemistry 43:95–99 (1985).
Casu et al.; Arzneim.-Forsch./Drug Research 36(I), No. 4: 637–642 (1986).
Fransson, et al.; Structural Features of Heparin Variants Having High Anti-X Clotting Activity; Carbohydrate Research, 104 (1982) 139–146.

Primary Examiner—Ronald W. Griffin
Assistant Examiner—Nancy S. Carson
Attorney, Agent, or Firm—Davis Hoxie Faithfull & Hapgood

[57] ABSTRACT

The compositions of the invention are composed of fragments of heparin consisting essentially of repeated disaccharide sequences corresponding to the regular regions of heparin and possessing a MW between 4,800 and 9,000. These compositions can be used for the regulation of physiological systems.

18 Claims, 3 Drawing Sheets

LOW MOLECULAR WEIGHT HEPARINS OF REGULAR STRUCTURE, THEIR PREPARATION AND THEIR BIOLOGICAL USES.

The subject of the invention is low molecular weight heparins of regular structure, a procedure for their preparation and their biological uses.

It relates more especially to low MW heparins exhibiting an activity in the area of the regulation of certain physiological systems while lacking almost completely the anticoagulant activity which manifests itself through antithrombin III (ATIII).

It is known that heparin possesses an anticoagulant activity manifesting itself principally through antithrombin III (ATIII).

The work carried out on the structure/activity relationships of heparin has shown that this type of anticoagulant activity is found to be associated in particular with the so-called irregular regions of heparin, more especially with the region corresponding to the pentasaccharide of structure DEFGH, described in the patent application FR No. 2.535.324, of formula:

It is also known that certain activities of heparin or of fragments of heparin can be preserved to a certain extent in the absence of the binding site for ATIII or when this latter is modified, but the structures responsible for such activities are unknown.

Thus, Folkman et al. (Science Vol. 221-1983—p. 719-725) have reported an inhibitory activity towards angiogenesis for mixtures of hexasaccharides lacking anticoagulant activity, and used in combination with corticoids.

Karnowsky et al. have carried out experiments on O-desulfated and N-desulfated heparins and have shown that they always possess the inhibitory activities of standard heparin on the proliferation of smooth muscle cells to a certain but lesser extent.

In addition, an anti-complement activity of heparin, independent of the anticoagulant activity, has been demonstrated.

Other work has shown that the anticoagulant activity of heparin can be modified by carrying out cleavages between the carbon atoms $C_2$-$C_3$ of the non-sulfated uronic acids by means of sodium periodate.

Thus, Fransson and Lewis have described in Febs. Letters, vol. 97, No. 1, p. 119-123, 1979, have described experimental conditions which consist of subjecting heparin to the action of periodate at either pH 3 at 4° C., or at pH 7 at 37° C. The heparin chains obtained are oxidized selectively at the site of the D-glucuronic acids in the first case whereas an oxidation at the site of all of the non-sulfated uronic acid residues is produced under the second type of conditions.

The resulting chains are reduced by $NaBH_4$ or fragmented in alkaline medium according to a β-elimination process.

The authors conclude that the oxidation and the cleavage of the D-glucuronic acid residues result in a slight diminution of the molecular weight but with retention of the anticoagulant activity.

On the other hand, the cleavage at pH 7 and 37° C. of the non-sulfated D-glucuronic and L-iduronic acids leads to the abolition of the anticoagulant activity and to a more considerable fragmentation of the molecule.

In an article published in Carbohydrate Research 36, p. 339-348, 1974, Fransson reported the periodic oxidation of the uronic residues in dermatan sulfate at various pHs at 4° C. or 37° C.

The author points out that by working at pH 5, the cleavages at the level of the glucuronic acids are produced only in a proportion of less than 5% and that by working at pH 3 these cleavages are not produced at all. These results thus appear to contradict those obtained with heparin in which cleavages occur preferentially at the level of the D-glucuronic acids at pH 3.

The action of periodate has also been reported by Casu et al. in Arzneim. Forsch./Drug Res. 36 (1) No. 4, p. 637-642, 1986.

According to this article, different preparations of heparin are subjected to periodic oxidation (pH 5.3 at 4° C. for 24 h.) which cleaves between the carbon atoms at positions 2 and 3 of all the non-sulfated uronic acids. For reference, a preparation is subjected to a subsequent step of partial acid hydrolysis and the fragments obtained are dialyzed.

This step of partial acid hydrolysis leads to a considerable fragmentation of the chains and to an at least partial destruction of the functional groups, as is pointed out by Fransson in Carbohydr. Res. 80, 131-145 (1980).

Furthermore, this method inevitably leads to a mixture of chains of MW varying over a large range, and produces numerous di, tetra and hexasaccharides in particular.

Now the inventors have demonstrated that for the production of stable pharmaceutical compositions which can be used in therapy for the regulation of certain physiological systems, a combination of the following properties is essential: length of the fragments; degree of charge; absence of the binding site for ATIII, in order to avoid the undesirable effects associated with an anticoagulant activity.

The study of the cleavage processes by means of periodic acid and of the means of fragmentation have led them to the observation that, by carrying out the periodic oxidation under specific experimental conditions but also of using a combination of specific steps, it is possible to obtain a composition of fragments of heparin of low MW in a favourable range and lacking the binding site for ATIII, while conserving at least the major part of their functional groups.

The aim of the invention is thus to furnish compositions of heparin which, at active doses, are endowed with pharmacological properties of great value, approximately equivalent to those of heparin without exhibiting the disadvantages of being endowed with anticoagulant properties.

It also relates to furnishing a fragmentation procedure for heparin which makes it possible to obtain fragments of a given MW, lacking nonetheless the binding site for ATIII and the degree of charge of which corresponds approximately to that of the corresponding sequences in the chains of natural heparin.

The invention also relates to uses of these compositions for the preparation of medicines active on the regulation of certain physiological systems in particular.

The compositions of the invention are characterized by the fact that they are essentially composed of fragments lacking repeating disaccharide sequences of the non-sulfated uronic acid - glucosamine N sulfate type, and corresponding to the following general Formula I:

$$R-(X-Y)_n-R' \qquad (I)$$

in which

X represents either a sulfated iduronic acid residue of Formula II:

(II)

or, to the extent of 1 residue for 2 chains at least, a non-sulfated uronic acid residue (D-glucuronic or L-iduronic) cleaved between the carbon atoms at positions 2 and 3, of Formula III:

(III)

Y represents a D-glucosamine residue of Formula IV:

(IV)

$R_1$, being a hydrogen atom or a $-SO_3^-$ group $R_2$, a $-SO_3^-$ group or a $-CO-CH_3$ group, the proportion of the $-SO_3^-$ groups being about at least 90%, and $R_3$, being a $-SO_3^-$ group or a hydrogen atom, the proportion of the $-SO_3^-$ groups being about at least 70%, R represents a hydrogen atom or a residue:

(V)

$R_1$ to $R_3$ being as defined above, and $R_4$ representing a hydrogen atom or a uronic acid residue, R' represents either a hydrogen atom, or an unmodified uronic acid residue, or a uronic acid residue modified during the course of periodic oxidation and the aldehyde functions of which have been reduced to alcohols, with $7 \leq n \leq 15$ for the major species, which corresponds to chains of MW of about 4,800 to 9,000, and their pharmaceutically acceptable salts.

It should be noted that the open X residues are residues which have remained incorporated in the glycosamino-glycan chain during the beta-elimination step at alkaline pH. They represent either a non-sulfated D-glucuronic acid or a non-sulfated L-iduronic acid, the bonds between the carbon atoms at positions 2 and 3 of which have been cleaved.

The compositions of the invention such as those characterized by HPLC carried out with a TSK 2000 SW column coupled to a photometric detector at 205 nm, using 0.5M Na$_2$SO$_4$ as solvent at a flow-rate of 1 ml/min, possess:

a mean molecular weight of the order of 6,000–7,000 Da, more particularly of 5,800 to 7,000 Da, and in particular of the order of 6,000 Da, 70% of the species being comprised between 4,800 and 9,000 daltons and 90% between 3,600 and 11,000 Da, a molecular weight at the highest point of the peak of the order of 6,000 to 6,500 Da, more precisely of 5,500 to 6,500 Da, and in particular of the order of 5,500 to 6,000 Da, less than 5% of the chains smaller than dodecasaccharides, less than 5% of the chains exceeding 11,000.

In accordance with another feature, the compositions of heparin of the invention are those obtained by fractionation by means of alcohol in the presence of a mineral salt of a mixture resulting from the depolymerization of heparin by the action of a strong base on heparin chains subjected beforehand to the action of periodate, the depolymerization being followed by a reduction of the aldehyde groups formed during the periodic oxidation.

In an advantageous manner, the compositions of the invention possess a ratio of sulfate groups $SO_3^-$ and carboxyl groups $COO^-$ per mole of between 2.2 and 2.8. This ratio is more especially 2.4. This ratio is high compared with mean values of other chains of heparin and results from the low molecular weight chains of heparin according to the invention being composed essentially of trisulfated disaccharide units. These heparins of low MW are said to be of regular structure on account of the presence of these disaccharide units and with reference to the scientific literature (PERLIN A. S., CASU, B. SANDERSON, G. R. "220 MHz spectra of heparin, chondroitins and other mucopolysaccharides". Can. J. Chem. 1970; 48: 2260–8).

The invention also relates to the salts of these compositions, in particular to the sodium, potassium, calcium and magnesium salts as well as the salts of physiologically acceptable organic cations.

The subject of the invention also includes a procedure for the preparation of compositions of fragments of heparin such as those defined above, including the controlled oxidation of heparin by means of periodate.

The procedure of the present invention is characterized in that:

(a) an aqueous solution of heparin at a final concentration of 0.5 to 5% (wt/v) is treated with periodic acid at a final concentration of 0.5 to 4% (wt/v), at a pH between 4.5 and 6.5 and at a temperature between 0° and 10° C.;

(b) the heparin chains thus obtained are treated with a strong base at a pH higher than about 11;

(c) the fragments of depolymerization thus obtained are treated with a reducing agent;

(d) after removal of excess reducing agent, if necessary, the reduced fragments are precipitated by means of an alcoholic solvent after the addition of a mineral salt;

(e) an aqueous solution of the precipitate thus obtained containing an added mineral salt is treated with alcohol so as to remove the fragments of very low molecular weight;

(f) the precipitated product thus formed is recovered and the salt corresponding to the strong base used is converted, if necessary, into another pharmaceutically acceptable salt.

It should be noted that step e corresponds to a fractionation to remove certain chains and not to a global precipitation.

More particularly, this procedure consists of a combination of the following steps:

the controlled oxidation of heparin carried out by reacting heparin in aqueous solution at a final concentration of 0.5 to 5% (wt/v) with a salt of periodic acid at a final concentration of 0.5 to 4% (wt/v), at a pH varying between 4.5 and 6.5, and preferably at a pH of 5, and at a temperature varying from 0° to 10° C., for about 15 to 48 h in the absence of light.

the depolymerization of the heparin chains obtained by addition of a strong base such as sodium hydroxide at a pH higher than about 11, in particular between 11 and 12, advantageously between 11.2 and 11.6, and preferably in the vicinity of 11.5;

the reduction of the fragments of depolymerization by means of a reducing agent and after removal of the unreacted reducing agent, if necessary, the recovery of the reduced fragments of heparin by precipitation by means of a solvent in which they are insoluble, the isolation of the desired fragments by fractionation by means of alcohol in the presence of a mineral salt of an aqueous solution obtained by redissolving in water the previously isolated precipitate and by recovering the precipitate formed.

The carrying out of the depolymerization following a specific procedure combined with the use in the procedure of the invention of a fractionation step makes it possible to isolate a composition of fragments corresponding to a specific therapeutic profile and possessing in particular a satisfactory therapeutic index.

In the periodic oxidation step, heparin and the salt of periodic acid are preferably used in amounts leading to final concentrations of 1.5 to 5% and 1.5 to 2.5% (wt/v), respectively.

The salt of periodic acid is advantageously constituted by sodium metaperiodate.

In order to remove residual periodate, a dialysis is carried out using dialysis tubing with a porosity of 3 to 4,000 Da for about 15 h.

Use may also be made of chromatography on an anion exchange resin, for example on a resin such as that marketed under the name of Amberlite IRA 400, this resin being used in an amount sufficient to retain the residual periodate and the derivatives of periodate formed during the reaction, that is to say 1/6 to ⅛ of the reaction volume, for example. This procedure, more rapid than dialysis and highly reproducible, makes it possible to carry out the beta-elimination starting from conditions which are easy to standardize.

According to a preferred embodiment of the invention, heparin is dissolved in water, more especially demineralized water, at 4° C., at a concentration of about 5% (wt/v), a salt of periodic acid such as sodium metaperiodate is added so as to give a final concentration of about 2% (wt/v). The pH of the solution is immediately adjusted to 5 by means of dilute hydrochloric acid or dilute sodium hydroxide. The solution is left to stand in the dark at +4° C., preferably for 24 hours.

In order to remove the residual periodate, a dialysis is carried out using dialysis tubing with a porosity of 3 to 4,000 Da for about 15 hours against running demineralized water.

The chains of heparin obtained are subjected to a depolymerization step in a basic medium.

For this purpose, a strong base, more especially a concentrated solution of sodium hydroxide, is added so as to produce a final molarity of base of 0.2N.

The basic solution obtained is stirred for 2 hours at room temperature.

The depolymerization fragments of heparin are then subjected to a reduction step in order to convert the aldehyde groups resulting from the cleavage of the bond between the carbon atoms $C_2$ and $C_3$ of the uronic acid residues.

A reducing agent such as sodium borohydride is employed in an amount of 50 mg per gram of heparin used, and stirring is maintained for 6 hours at room temperature.

The unreacted reducing agent is destroyed by lowering the pH to 4 by means of acid, for example hydrochloric acid, and advantageously with vigorous stirring for about 15 minutes.

The reduced fragments of heparin are recovered by precipitation.

Advantageously, the pH is adjusted to 7 by means of a base, in particular concentrated sodium hydroxide, then 20 g/liter of mineral salt are added and a precipitation is carried out by means of 1.5 volume of alcohol.

The mineral salt used is advantageously constituted by sodium chloride. For the alcoholic precipitation, recourse is preferably had to ethanol.

The precipitate formed is recovered by centrifugation, washed with a solvent in which it is insoluble such as ethanol, and dried at 40° C. in a vacuum.

In order to isolate the fragments of the invention from this precipitate recourse is had to a fractionation step.

An alcoholic fractionation is advantageously carried out by working as follows:

The precipitate of fragments of heparin is redissolved in water, more particularly demineralized water, at room temperature, that is to say at about 18° to 20° C. so as to give a concentration of 5% (wt/v).

A mineral salt such as sodium chloride is added in an amount sufficient to give a final concentration of 1%. The pH of the solution is adjusted to 3.5 by means of acid, for example dilute hydrochloric acid.

0.85 volume of a solvent in which the desired fragments are insoluble, such as ethanol, is then added with moderate stirring.

The mixture is then left to stand for about 10 hours at 18°-20° C.

The precipitate is collected by centrifugation, washed with a solvent such as ethanol and dried in a vacuum at 40° C. for 24 hours.

If necessary, this precipitate may be subjected to an additional purification step after being dissolved in demineralized water, consisting of chromatography on an anion exchange resin such as a Amberlite IRA 400 resin, $OH^-$, having a volume of the order of 1/10 of the reaction volume, in order to remove possible impurities.

It consists of a mixture of fragments of heparin, the majority of which have a MW varying between about 4,800 and 9,000 Da. If required, the product thus obtained can be converted into another pharmaceutically acceptable salt such as a calcium salt, a potassium salt or a magnesium salt according to known methods.

The compositions of heparin of the invention, composed essentially of fragments of molecular weight of between 4,800 and 9,000, and lacking the binding site for ATIII, makes it possible to take advantage of pharmacological properties of great value which are associated with the regular regions of heparin. At active doses, these compositions have only very low anticoagulant activity.

The study of their pharmacological properties has thus shown that these compositions exert an inhibitory effect on the growth of smooth muscle cells approximately equivalent to that of heparin.

Various experiments have made it possible to demonstrate other inhibitory effects, in particular with respect to the activation of complement and towards inflammatory reactions of the delayed hypersensitivity type as well as towards the enzymatic activity of heparanase.

They are also able to exert a potentiating and stabilizing action on certain factors of cell growth.

In addition, these compositions are quite innocuous and are particularly stable.

They are thus particularly suited to constitute active principles of medicines.

The subject of the invention is thus pharmaceutical preparations characterized in that they contain an efficacious amount of a composition composed essentially of fragments of heparin such as those defined above in combination with a pharmaceutical vehicle.

In view of their properties, the medicines of the invention are especially useful in the following therapeutic indications:

the prevention of the proliferation of smooth muscle cells during angioplasties, acceleration of tissue repair, in conjunction in particular with skin diseases, prevention of the development of progressive atherogenous lesions and of the phenomena relating to arteriosclerotic degeneration, prevention of states of shock, prevention of the development of certain metastases.

The pharmaceutical preparations of the invention can be administered in different forms.

For administration by the oral route, recourse is had in particular to capsules, lozenges, tablets, pills, liposomes. These preparations advantageously contain from 50 mg to 5 g per unit dose, and preferably 20 to 250 mg for capsules, lozenges and pills.

As a consequence, the forms of administration depend essentially on the dose to be administered. The capsules, lozenges and pills are a practical means of administering low doses. For the administration of higher doses, it will be more practical to use drinkable solutions.

Other forms of administration of the invention are constituted by sprays, aerosols, ointments and creams.

The invention also relates to sterile or sterilizable, injectable pharmaceutical compositions for administration both by the intravenous route and by the intramuscular or subcutaneous routes.

These solutions advantageously contain from about 10 to about 150 mg/ml of active principle when they are destined to be injected by the subcutaneous route and from about 10 to about 100 mg/ml when they are intended for intravenous injection or perfusion.

In order to illustrate the invention, an example will be given below of the dosage which can be used in man: This dosage comprises, for example, the administration to the patient of about 500 mg/unit dose by the subcutaneous route 2 to 3 times per day. About 1,000 mg/d are administered by the intravenous route whereas the quantities injected by perfusion may amount to several tens of ml. These administrations are performed in a discontinuous manner at regular intervals, or by continuous perfusion.

The invention also relates to biological reagents, the active principles of which are constituted by the compositions of fragments of heparin such as those defined above. These biological reagents can be used as references or standards in comparative studies in different physiological systems in the regulation of which the GAGs are implicated.

Other properties and advantages of the invention will become apparent in the examples which follow and on making reference to the FIGS. 1 to 5, the FIGS. 1 and 3 on the one hand and 2 and 4 on the other represent the HPLC curves of a reduced depolymerization mixture and a composition according to the invention, respectively, FIG. 5, the $^{13}C$ NMR spectrum of a composition according to the invention.

EXAMPLE 1

Procedure for the preparation of a composition of fragments of heparin.

(1) Cleavage of the chains of heparin by means of periodic acid 10 g of injectable heparin from porcine mucus in the form of its sodium salt, titrating at 157 uI/mg in the Codex determination and at 155 u/mg in the anti-factor Xa determination of Yin et al; are dissolved in 250 ml of demineralized water at 4° C. The pH of the solution is adjusted to 5.0 by concentrated hydrochloric acid. 10 g of sodium metaperiodate ($NaIO_4$, MW: 213.89) dissolved in 250 ml of demineralized water at 4° C. are added with moderate stirring. The pH of the mixture is adjusted to 5.0 by means of concentrated hydrochloric acid. The solution is left in the dark for 24 hours in a cold room at +4° C.

(2) Removal of the residual periodate

The reaction solution is then distributed between 3 NOJAX 40 ® dialysis tubes (porosity from 3 to 4,000 Da) and is subjected to dialysis for 15 hours against running demineralized water.

(3) Depolymerization in basic medium

To 780 ml of the solution obtained after dialysis are added 16 ml of 10N sodium hydroxide, and the mixture is stirred for 3 hours at room temperature (of the order of 18°–21° C.).

(4) Reduction 500 mg of sodium borohydride (NaBH$_4$, MW: 37.83) are then added and the solution is stirred again for 4 hours at room temperature. The pH is then brought to 4 with the aid of concentrated hydrochloric acid. After stirring for 15 minutes, the pH is adjusted to 7 by means of concentrated sodium hydroxide.

To 820 ml of the solution thus obtained are added 16.4 g of NaCl, followed by 1270 ml of ethanol.

The mixture is left to stand for 3 hours, then centrifuged at 2,500 r/minute for 20 minutes.

The precipitate is collected, resuspended in 200 ml of neat ethanol, ground with an Ultra-Turrax ® and finally recovered by filtration on a fritted Büchner funnel. It is then dried in a vacuum at 40° C. for 5 hours.

8.9 g of intermediate product are thus recovered with the following properties:

Codex determination: 8 uI/mg
APTT determination: 7 uI/mg
Anti-Xa determination: 8 u/mg.

Figure 1:
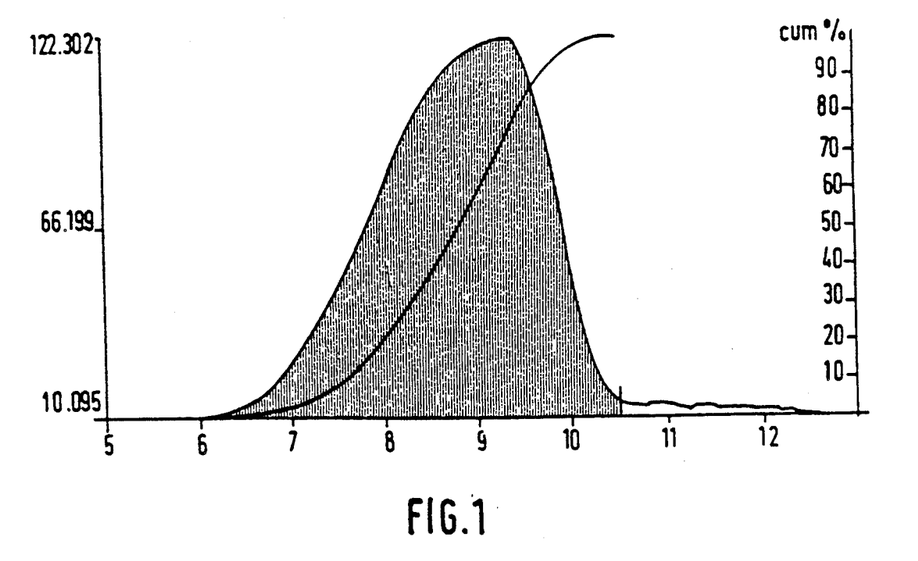

The molecular distribution of the composition is presented in FIG. 1 which corresponds to the HPLC curve recorded under the conditions mentioned on page 5.

(5) Alcoholic fractionation

The 8.9 grams are dissolved in about 120 ml of demineralized water at room temperature. 1.78 grams of NaCl are added and the pH of the solution is lowered to 3.5 by means of hydrochloric acid. The volume of the solution is adjusted to 178 ml by means of demineralized water. 151 ml of neat ethanol are added with stirring. The stirring is maintained for 15 minutes after the addition is complete, then the mixture is allowed to stand for 10 hours at room temperature.

The precipitate formed is collected by centrifugation for 20 minutes at 2,500 r/min. It is resuspended in 150 ml of neat ethanol, ground with an Ultra-Turrax, recovered by filtration on a fritted Büchner funnel, washed with 300 ml of neat ethanol and finally dried in a vacuum at 40° C. for 24 hours.

This leads to the recovery of 5.0 g in the form of a white powder, 5.0 g of the product IC 1772 having the following properties:

Codex determination: 11 uI/mg
APTT determination: 9 uI/mg
Anti-Xa determination: 12 u/mg.

Figure 2:
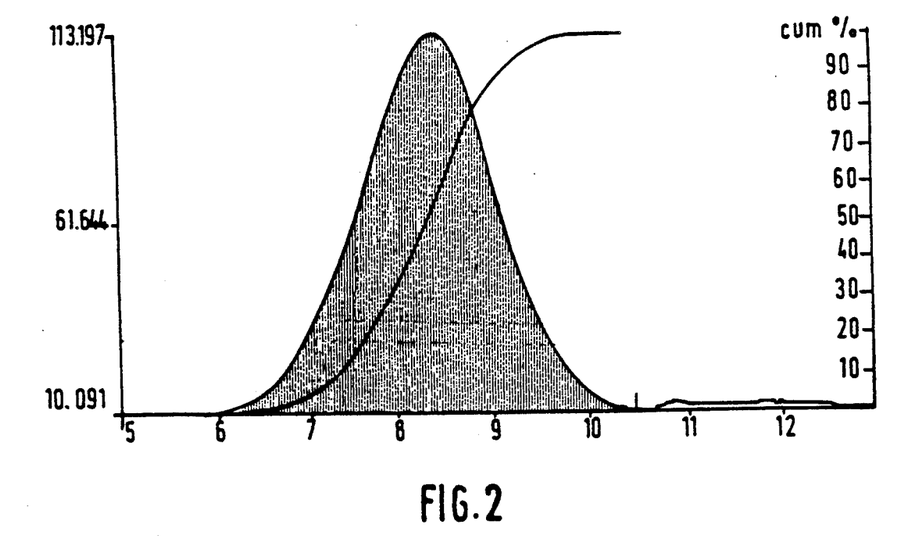

The molecular distribution of the composition obtained is apparent upon examination of FIG. 2 which corresponds to the HPLC curve recorded under the above conditions.

$^{13}$C NMR ANALYSIS

Figure 5:
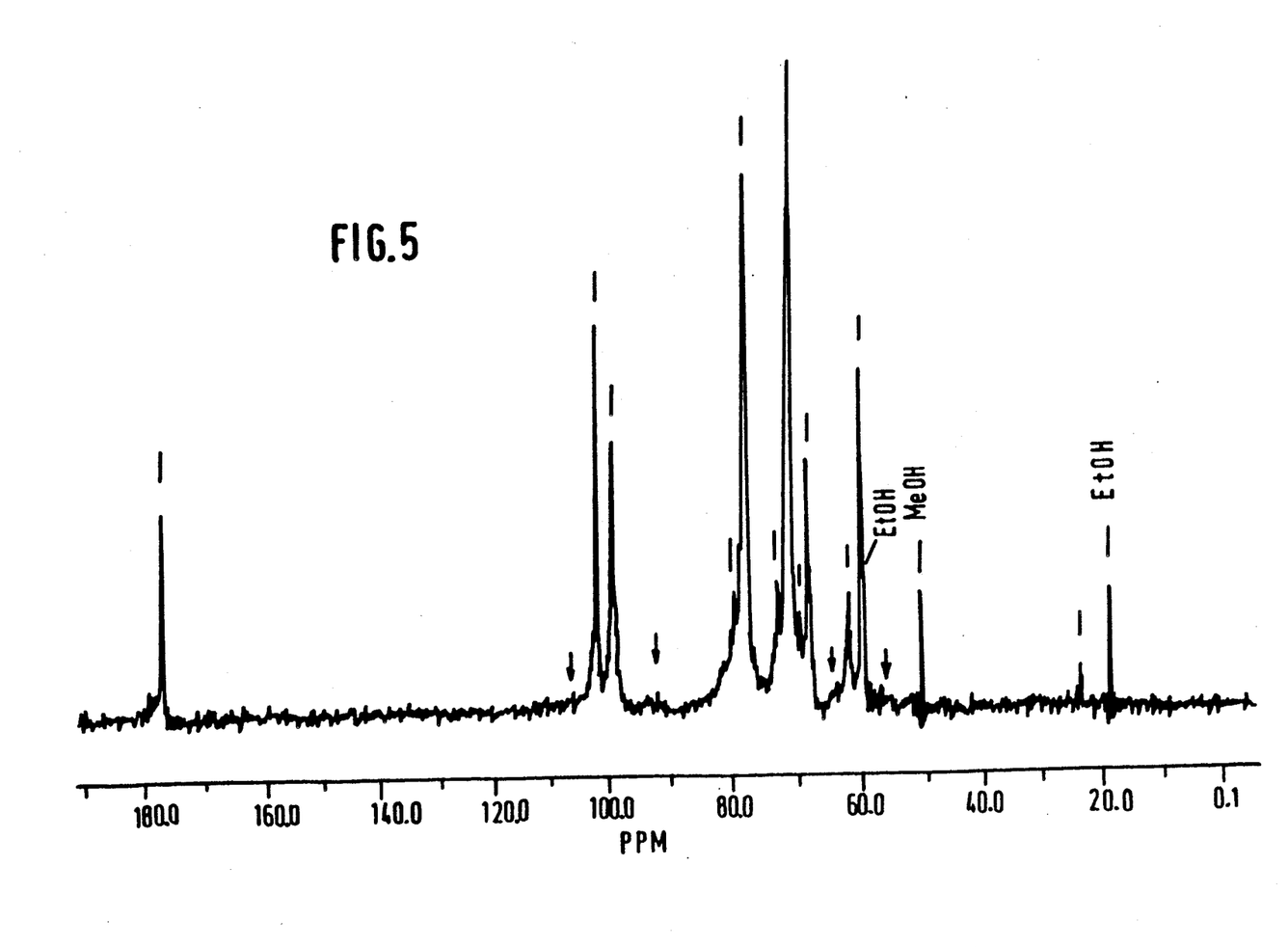

The carbon 13 NMR spectrum is shown in FIG. 5. This spectrum was determined on a solution of the compound dissolved in deuterium oxide at 25 MHz at 35° C. The chemical shifts are measured with respect to methanol (51.6 ppm).

Examination of this spectrum shows that it displays the characteristic signals of a disaccharide chain of the 2-O-sulfo-α-L-iduronic acid (1→4) 6-O-sulfo-N-sulfo-α-D-glucosamine (1→4) type.

The presence of the segments of the anomeric carbons is observed in particular at 101.7 ppm (2-O-sulfo-α-L-iduronic acid) whereas the signals characteristic of the non-sulfated D-glucuronic and L-iduronic acids (104.5 ppm) are not present, in contrast to the spectrum of a preparation of heparin in which they may represent up to 30 to 40% of the total of the signals for the uronic acids.

In the region of the C-2 glucosamine, only the signal at 60.5 ppm (C-2 of N-sulfo-glucosamine) is present. The signal characteristic of N-acetyl-glucosamine (56.4 ppm) is scarcely detectable whereas it is present in the starting heparin.

In the region of the C-6 glucosamine (62.5 for C-6-OH and 69 for C-6-OS). The presence of the two signals for the non-sulfated and sulfated species is observed.

It is important to note that the ratio of the intensity of the signals at 99.4 ppm and 101.7 ppm is equal to 1, which confirms the sole presence of 2-O-sulfo-L-iduronic acid.

The presence of several residues of N-acetyl-glucosamine can be detected. Similarly, the signal for NHAc (24.6 ppm) is apparent.

Conductimetric analysis:

The degree of sulfation determined by conductimetry is 2.3. The number of charges per disaccharide unit is 3.3.

EXAMPLE 2

(1) 200 g of injectable heparin, sodium salt, titrating at 154 uI/mg in the Codex determination and at 158 u/mg in the anti-factor Xa determination are dissolved in 5 liters of demineralized water at +4° C.

The pH of the solution is adjusted to 5.0 by concentrated HCl. Under moderate stirring are then added: 200 g of sodium metaperiodate dissolved in 5 liters of demineralized water at +4° C. The pH of the mixture is again adjusted to 5.0 by means of concentrated HCl.

The solution obtained is left in the dark for 24 hours in a cold room at +4° C. with moderate stirring.

(2) It is then distributed between 50 dialysis tubes and dialyzed for 14 hours against running demineralized water at room temperature.

(3) When this dialysis is complete, 14.5 liters of solution are recovered to which are added 116 g of pure sodium hydroxide in the form of pellets. The solution thus obtained is stirred for 3 hours at room temperature.

(4) 10 g of sodium borohydride are then added and stirring is continued for 4 hours.

The pH of the solution is lowered to 4 with the aid of concentrated HCl for 15 minutes, then it is again brought to 7 by means of concentrated sodium hydroxide.

The volume of the solution thus obtained is 15.2 liters. 304 grams of NaCl are then added, followed by 22.8 liters of ethanol.

The mixture is left to stand for 48 hours at room temperature. The clear supernatant is siphoned off, the precipitate is collected, resuspended in 3 liters of neat ethanol, ground with an Ultra-Turrax, and recovered by filtration on a glass frit.

Finally, it is dried in a vacuum at 40° C. for 15 hours.

Figure 3:
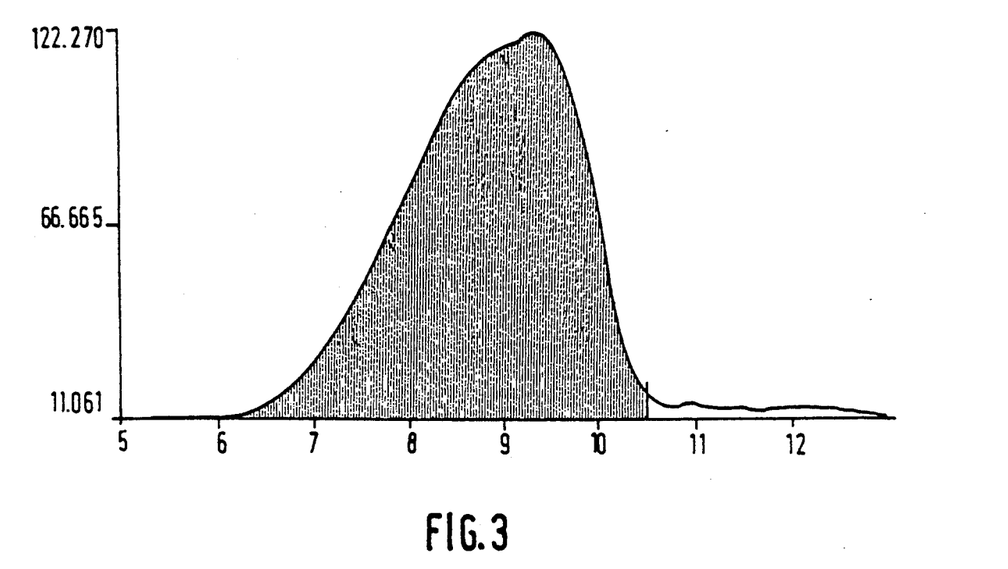

181 grams of fragments of heparin are recovered having the following properties:

Codex determination: 10 uI/mg
APTT determination: 9 uI/mg
Anti-Xa determination: 9 u/mg
Molecular distribution: see FIG. 3.

(5) These 181 grams are dissolved in about 3 liters of demineralized water at room temperature.

36.2 grams of NaCl are added and the pH of the solution is adjusted to 3.5 by means of concentrated HCl.

The volume of the solution is adjusted to 3.62 liters with the aid of demineralized water. 3.077 liters of neat ethanol are added with moderate stirring. The stirring is maintained for 15 minutes after addition is complete, and the mixture is left to stand for 10 hours at room temperature. The precipitate formed is collected by centrifugation for 20 minutes at 2,500 r/min. It is resuspended in 2 liters of neat ethanol, ground with an Ultra-Turrax, recovered by filtration on a frit, washed with 3 liters of neat ethanol and finally dried in a vacuum at 40° C. for 24 hours.

Figure 4:
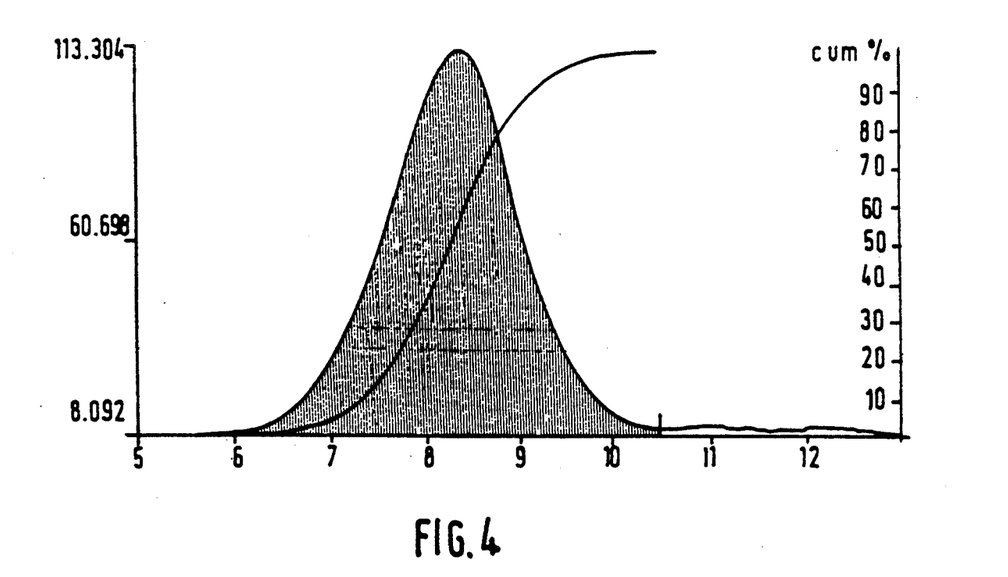

104 grams of white powder are finally obtained having the following properties:
 Codex titer: 13 uI/mg
 APTT titer: 10 uI/mg
 Anti-Xa titer: 13 u/mg
 Molecular distribution: see FIG. 4.

EXAMPLE 3

(1) Cleavage of the chains of heparin with the aid of periodic acid 45 g of injectable heparin from porcine mucus in the form of its sodium salt are dissolved in 600 ml of demineralized water. 18 g of sodium metaperiodate dissolved in 200 ml of demineralized water at 5° C. are added with moderate stirring. The pH is adjusted to 5 by the addition of concentrated HCl and the reaction volume is brought to 900 ml with distilled water. The solution is kept in the dark for 24 to 26 hours in a cold room (0°–10° C.). The precipitate formed is removed by filtration.

(2) Removal of the residual periodate

The 900 ml of the oxidation reaction of heparin are percolated through an ion exchange resin Amberlite IRA 400, Cl⁻ (Rohm and Haas Company, U.S.A.) having a volume of ⅛th of the reaction volume (110 ml) during 2 hours.

The column is rinsed by 225 liters of demineralized water. The rinsings are combined with the percolated solution. 1,125 ml of solution free of periodate and iodate are thus obtained. The absence of periodate is checked by titrimetry. The titration curve of 5 ml of the oxyheparin solution by 2.5 ml of 1N sodium hydroxide reveals the absence of periodate. Periodate in solution would have resulted in a characteristic inflexion for a pKa of about 7.8.

(3) Depolymerization in basic medium

Beta-elimination is initiated by adding 10N sodium hydroxide stepwise until a pH of 11.5 is obtained. The reaction is allowed to continue for 1 hour at room temperature (18°–23° C.) with stirring.

(4) Reduction 10 g of sodium borohydride is then added for every 100 g of starting material used.

This reduction is carried out for at least 3 hours with stirring. The excess reducing agent is then removed by addition of 25 g/l of NaCl, then the pH of the solution is adjusted to 4 with the aid of concentrated HCl. The solution is then adjusted to a neutral pH with the aid of concentrated NaOH.

The product is precipitated by the addition of 1.5 volumes of neat ethanol. The precipitate is allowed to settle during 48 to 72 hours, then dehydrated with ethanol and dried in a vacuum at 40° C. for 12 hours.

(5) Alcoholic fractionation

The product is taken up in demineralized water (180 ml for 10 g of heparin used). 2 g of NaCl are added for 10 g. The pH is adjusted to 3.5 and the solution is made up with demineralized water to a volume of 200 ml for 10 g used.

0.85 volume of neat ethanol is added with gentle stirring. The precipitate is allowed to settle during 48 to 72 hours. The precipitate is taken up, dehydrated with neat ethanol, ground with an Ultra-Turrax ® and dried at 40° C. The product is obtained in the form of a white powder. The product soluble in alcohol was analysed in HPLC. An average molecular weight of the order of 3500 has been measured for the oligosaccharides.

(6) Purification

The product obtained in the preceding step is dissolved to give a 5% solution in demineralized water and is purified on an anion exchange column of Amberlite IRA 400, OH⁻ (1/10 of the reaction volume).

The product is then tested for its properties.

Degree of sulfation (determined according to Helbert J. R. and Marini M. A., Biochemistry, 1963, 2, 1101-1106).

The $SO_3/COO^-$ ratio varies from 2.2 to 2.4.

Anti-IIa and anti-Xa activities:
 TCK (1): 4 u/mg
 USP (2): 13 u/mg
 Anti-IIa activity (3): 12 u/mg
 Anti-Xa activity (4) (Yin and Wessler): 8 u/mg
 Anti-Xa activity (on the chromogenic substrate S 2222 in a purified system): 1 u/mg.

The references to the systems used for carrying out the measurements are the following:
(1): R. R. Proctor and S. Rapaport - Ann. J. Clin. Pathol., 1961, 36, 212-219
(2): XXIst American Pharmacopoeia.
(3): Measured by prolongation of the thrombin time.
(4): E. T. Yin, S. Wessler, J. V. Butler - J. Lab. Clin. Med., 1973, 81, 298-310.

DEMONSTRATION OF URONIC ACID RESIDUES RING-OPENED BETWEEN C2 AND C3

The Smith's degradation at pH 3 and 100° C. during one hour of a solution at 5% of IC 1772 results in the specific cleavage of the oligosaccharidic chains at the level of the uronic acids opened between $C_2$ and $C_3$. As a result, the average molecular weight of the product is lowered as shown by gel filtration on TSK 2000 with refractometric detection.

The results are expressed as follows:

Mna represents the number average molecular weight such as defined by W. W. YAU, J. J. KIRKLAND and D. D. BLY (in Modern size-exclusion liquid chromatography, Wiley Interscience Publication) of the product tested as such;

Mnb represents the number average molecular weight after having carried out the Smith degradation as indicated above;

Mna/Mnb - 1 gives the number of sites sensitive to the Smith degradation by oligosaccharidic chain, which corresponds to the number of uronic acids opened between $C_2$ and $C_3$.

The test was carried out on two batches of IC 1772.

|  | p 46 VH | p 55 VH |
|---|---|---|
| Mna | 5503 | 5573 |
| Mnb | 3896 | 3745 |
| (Mna/mnb) - 1 | 0.4 | 0.5 |

It then appears that, under the analysis conditions, IC 1772 contains one open uronic acid for two chains, at least.

ANTICOAGULANT EFFECT OF IC 1772 IN HUMAN PLASMA

Below are reported the results obtained relating to:
1. The in vitro anti-IIa and anti-Xa activities in different systems.
2. The thrombin coagulation times (TCT).

(1) In vitro anti-IIa and anti-Xa activities

| ASSAY | IC 1772 u/mg | Heparin Standard u/mg |
|---|---|---|
| TCK[1] | 10 | 160 |
| USP[2] | 13-15 | 160 |
| anti-IIa[3] activity | 16 | 160 |
| anti-IIa activity (on chromogenic substrate S 2238 in purified system) | 36 | 160 |
| anti-IIa activity (on chromogenic substrate S 2238 in plasmatic system) | 1 | 160 |
| anti-Xa[4] activity (Yin and Wessler) | 12-15 | 160 |
| anti-Xa activity (on chromogenic substrate S 2222 in purified system) | 2-3 | 160 |
| anti-Xa activity (on chromogenic substrate S 2222 in plasmatic system) | 5-10 | 160 |

The references to the systems used for carrying out the measurements are the following:
[1] R. R. Proctor and S. Rapaport - Ann. J. Clin. Pathol., 1961, 36, 212-219.
[2] XXIst American Pharmacopoeia.
[3] Measured by prolongation of the thrombin time.
[4] E. T. Yin, S. Wessler, J. V. Butler - J. Lab. Clin. Med., 1973, 81, 298-310.

(2) TCT:

In Table 1 below, the results are reported in the form of coagulation times expressed in seconds for 3 assays carried out with 3 types of plasma used for the study of the APTT activity. The control is carried out in normal plasma. The results correspond to the mean of two independent assays.

TABLE 1

| μg/ml normal plasma | plasma depleted in | | | |
|---|---|---|---|---|
|  | ATIII | HC II | ATIII | HCII |
| 0 | 22 | 20 | 20 | 20 |
| 2,5 | 36 | 26 | 24 | 22 |
| 5 | 110 | 51 | 27 | 22 |
| 10 | >300 | >300 | 40 | 22 |

A prolongation of the thrombin time is observed at doses of 5 and particularly at 10 ug/ml which seems to depend on HCII.

INHIBITION OF THE PROLIFERATION OF SMOOTH MUSCLE CELLS (SMC) IN VITRO

Experimental model:

The smooth muscle cells (SMC) are derived from an abdominal segment of the aorta of a Sprague Dawley rat. Small pieces of media are placed in culture in RPMI-1640 medium supplemented with 20% fetal calf serum (FCS). At the end of 1 to 2 weeks, the SMC migrate out of the tissues and begin to proliferate.

$5-8.10^3$ SMC are placed in culture in multi-well plates. After 24 hours, their growth is arrested by washing followed by the addition of RPMI medium+2% of platelet-free plasma (or RPMI+0.4% of FCS) for 72 hours.

The cells are then placed again for 5 to 7 days in RPMI medium supplemented with 20% of FCS with or without the compound to be tested, this latter being employed at different concentrations.

The net growth of the SMC in the control assays and those supplemented with the products to be tested is obtained by subtracting the number of cells at the beginning from the number of cells at the end of the experiment (measurement in duplicate by a Coulter counter).

The % inhibition is given by the following formula:

$$\% \text{ inhibition} = \left[1 - \frac{\text{net growth of tested cells}}{\text{net growth of control cells}}\right] \times 100$$

(see Castellot et al., J. Cell. Biol., 102, 1986, 1979-1984).

The results obtained depending on the concentration of IC 1772 are the following (for comparative purposes, the values for the inhibition obtained with heparin are reported).

| Amount of product | inhibition | |
|---|---|---|
|  | IC 1772 | Heparin |
| 1 μ/ml | 25% | 20% |
| 10 μ/ml | 45% | 60% |
| 100 μ/ml | 70% | 80% |

An activity very close to that of standard heparin is observed in this experimental model.

INHIBITION OF THE PROLIFERATION OF SMOOTH MUSCLE CELLS (SMC) IN VIVO: BALLOON CATHETER MODEL

Experimental model:

The experiment is carried out on Sprague Dawley male rats aged 5 months and weighing about 500 g.

The animals are anesthetized and the endothelium of the left carotid artery is stripped by the intraluminal passage of a balloon catheter for embolectomy introduced into the external branch of the carotid.

The product to be tested or a sterile blank solution is administered by continuous infusion in lactated Ringer solution into the left jugular vein (use of an osmotic infusion pump (Alzet) placed on the back of the animal). The treatment is continued for 4 weeks at a rate of 2.5 ul/hour. The dose administered was 1 mg/kg/hour.

After 28 days the animals are anesthetized and the carotid arteries removed. At 17, 9 and 1 hour before anesthesia, the animals received an intraperitoneal injection of tritiated thymidine.

The results are expressed by the content of DNA in the damaged right carotids (RC) and the undamaged left carotids (LC) according to the following type of calculation.

$$\text{Inhibition (\%)} = \left[1 - \frac{\text{DNA* treated animals}}{\text{DNA* control animals}}\right] \times 100$$

-continued $$DNA^* = \frac{DNA_{LC} - DNA_{RC}}{DNA_{RC}}$$

(see A. W. Clowes and M. M. Clowes, Labor. Investig., 1985, 52 (6), 612-616).

Results:

In a first assay involving 10 animals, an inhibition of about 50%, close to that of heparin, is observed with the product IC 1772 tested.

INHIBITION OF THE COMPLEMENT SYSTEM

Heparin inhibits the generation of the alternate amplifying $C_3$ convertase of complement by inhibiting the formation of the bimolecular complex between the proteins $C_3b$ and B.

The effect of heparin and the product IC 1772 on the $C_3b$-B binding was studied by using B proteins labelled with $^{125}I$ ($^{125}I$-B) and sheep erythrocytes as carriers of protein $C_3b$ ($E^SC_3b$).

The concentration of heparin or the oligosaccharide tested required to bring about 50% inhibition of the formation of the $C_3b$-B complex is called the IC50.

This measurement is made in vitro in a system of purified proteins.

Experimental system $E^SC_3b$ (0.75-2.5×10$^7$) are incubated in different concentrations of $^{125}I$-B in veronal buffer containing 0.1% of gelatin and 5 mM $Mg^{2+}$ for 30 mn at 30° C.

Duplicate samples of 70 μl for each reaction are deposited on 300 μl of a mixture of dibutylphthalate (Merck-Clevenot, France) and dinonylphthalate (Coger, Paris) (7:3 v/v) in 0.5 ml polypropylene tubes.

The tubes are centrifuged for 1 minute at 8,000 g in a Beckman microfuge (Beckman, Paris), then they are cut just abo the precipitates. The radioactivity of the bound ligand is counted.

The product IC 1772 was determined in comparison with heparin. The results expressed as IC 50 are the following:

IC 1772: 0.4 μ/ml
Standard heparin: 0.5 μ/ml.

Bleeding time:

The product is administered to the rabbit by the intravenous route at a dose of 5 mg/kg 15 minutes and 1 hour before the experiment.

The experimental model is that of Cade as described by Cade et al. in Thromb. Res. 35, 613-625, 1986.

The assays performed show that the product does not lead to any increase in the bleeding time at the dose of 5 mg/kg by the intravenous route.

Study of the antithrombotic activity of IC 1772

The following model is used:

The animals are anesthetized with 70 mg/kg of Ketaset ® (Bristol Lab, Syracuse, N.Y.) by the intramuscular route. By means of a surgical technique, a length of 2 cm is isolated along the right and left jugular veins. The product to be tested is injected by the intravenous route into the marginal vein of the ear exactly 5 minutes after the injection of a thrombogenic substance such as a mixture of concentrated prothrombin complex and viper venom (PCC/RVV). After 20 seconds, the jugular vein is ligated, and after 10 mn of stasis, the segments of the vein are withdrawn and placed in physiological serum, then the extent of clot formation is evaluated according to a scale of 0 to 4 (4 represents a single clot without free erythrocytes) (FAREED, J. WALENGA, J. M., KIUMAR, 2 and ROCK, A. "A modified stasis thrombosis model to study the antithrombotic actions of heparin and its fractions." Sem. Thromb. Hemost. 11 (2), 155-175, 1985).

IC 1772, administered by the intravenous route at a dose of 1 mg/kg to a group of 10 rabbits, showed very good antithrombotic activity in all of the animals.

We claim:

1. A composition of heparins of low molecular weight and their pharmaceutically acceptable salts, which composition is almost completely lacking anticoagulant activity and essentially consists of fragments lacking repeating disaccharide sequences of non-sulfated uronic acid glucosamine N-sulfate, the fragments having the following general Formula I:

$$R—(X—Y)_n—R \qquad (I)$$

in which (a) X is selected from the group consisting of a sulfated iduronic acid residue of Formula II:

and a non-sulfated uronic acid residue which is selected from the group consisting of D-glucuronic acid and L-iduronic acid and which is ring-opened between the carbon atoms at positions 2 and 3 of Formula III:

wherein X is the non-sulfated uronic acid residue to the extent of at least about one residue per every two fragments;

(b) Y is a D-glucosamine residue of Formula IV:

wherein $R_1$ is selected from the group consisting of a hydrogen atom and a —$SO_3$— group, $R_2$ is selected from the group consisting of a —$SO_3$— group and a —CO—CH$_3$ group wherein $R_2$ is a —$SO_3$— group for at least 90% of all occurrences of $R_2$ in the composition, $R_3$ is selected from the group consisting of a —$SO_3$— group and a hydrogen atom, wherein $R_3$ is a —$SO_3$— group for at least 70% of all occurrences of $R_3$ in the composition;

(c) R is selected from the group consisting of a hydrogen atom and a residue:

wherein $R_1$ and $R_2$ and $R_3$ are as defined above, and $R_4$ is selected from the group consisting of a hydrogen atom and a uronic acid residue;

(d) R' is selected from the group consisting of a hydrogen atom, an unmodified uronic acid residue, and a modified uronic acid residue containing aldehyde groups resulting from the cleavage of the bond between the carbon atoms C2 and C3 of uronic acid during the course of periodic oxidation and the aldehyde functions of which have been reduced to alcohols; and (e) $7 \leq n \leq 15$ for the majority of the fragments.

2. A composition according to claim 1 having on average 3.3 charges per disaccharide unit.

3. A composition according to claim 1 having, on HPLC carried out with a TSK 2,000 SW column coupled to a photometric detector at 205 nm and utilizing 0.5M $Na_2SO_4$ as solvent with a flow-rate of 1 ml/min:
a mean molecular weight between about 5,800 to 7,000 Da, 70% of the fragments having a molecular weight between about 4,800 and 9,000 daltons, and 90% between about 3,600 and 11,000 Da,
a peak having a highest point of molecular weight at about 5,500 to 6,500 Da,
less than 5% of fragments smaller than dodecasaccharides, and
less than 5% of fragments having a molecular weight greater than 11,000 Da.

4. A composition according to claim 3 wherein the peak has a highest point of molecular weight at about 5,500 to 6,000 Da.

5. A composition according to claim 1 having an NMR spectrum corresponding to that of FIG. 5.

6. A composition according to claim 1 wherein the fragments of the composition are in the form of salts of sodium, potassium, calcium or magnesium.

7. A pharmaceutical composition comprised of an amount of a composition according to claim 1 in combination with a pharmaceutically acceptable carrier, which amount is effective in inhibiting cell growth, complement activation or inflammatory reactions, or regulating cell growth factors.

8. A pharmaceutical composition, according to claim 1, in the form of a sterile, injectable, concentrated solution containing from about 10 to about 150 mg/ml when it is intended for subcutaneous injection, and from about 10 to 100 mg/ml when it is intended for intravenous injection or perfusion.

9. A process for the preparation of compositions of heparins of low MW which comprises the steps of:

(a) treating an aqueous solution of heparin at a final concentration of 0.5 to 5% (wt/v) with periodic acid at a final concentration of 0.5 to 4% (wt/v) at a pH between 4.5 and 6.5 and at a temperature between 0° and 10° C.;

(b) depolymerizing chains of heparin thus obtained with a strong base at a final molarity of the base of 0.1 to 0.3N;

(c) treating depolymerization fragments thus obtained with a reducing agent, removing excess reducing agent when it is in excess;

(d) precipitating reduced fragments obtained in a solvent in which the fragments are insoluble;

(e) redissolving the precipitate to form an aqueous solution;

(f) treating the aqueous solution, to which a mineral salt has been added with alcohol in order to fractionate and remove low molecular weight fragments;

(g) recovering the fragments in the form of a salt with a strong base and converting the salt corresponding to the strong base into a pharmaceutically acceptable salt.

10. A composition comprised of fragments of heparin which are obtained by the process of claim 9.

11. A process according to claim 9, wherein (a) Step a is carried out using a salt of periodic acid for about 15 to 48 hours, and protected from light;

(b) Step b is carried out at a pH of between about 11 and 12;

(c) in Step d, precipitating the reduced fragments with alcohol and a mineral salt.

12. A process according to claim 11 wherein in Step a heparin and the salt of periodic acid are used in amounts leading to final concentrations of 1.5% to 5% and 1.5 to 2.5% (wt/v), respectively.

13. A process according to claim 11 wherein the salt of periodic acid is sodium metaperiodate.

14. A process according to claim 11 further wherein the reduced fragments of heparin are precipitated by adjusting the pH to 7 and then, after addition of the mineral salt, adding 1 to 1.5 volumes of solvent.

15. A process according to claim 14 wherein the mineral salt is NaCl and the solvent is ethanol.

16. A process according to claim 11 wherein the reduced precipitated fragments of heparin are dissolved to give a 5% (wt/v) solution in water to which a mineral salt has been added to a final concentration of 1%, the pH of the solution is adjusted to 3.5 and 0.85 volume of an alcoholic solvent is added.

17. A process according to claim 9 wherein Step a is carried out at pH 5 at 4° C.

18. A process according to claim 9 further wherein the excess of reducing agent in step c is removed by a dialysis carried out with dialysis tubes having a porosity of 3 to 4,000 Da for about 15 h in order to remove residual periodate.

* * * * *

UNITED STATES PATENT AND TRADEMARK OFFICE
CERTIFICATE OF CORRECTION

PATENT NO. : 4,990,502
DATED : February 5, 1991
INVENTOR(S) : Lormeau, et al.

It is certified that error appears in the above-identified patent and that said Letters Patent is hereby corrected as shown below:

Column 16, line 16, change "$R-(x-y)_n-R$" to --$R-(x-y)_n-R'$--

Signed and Sealed this

Sixth Day of October, 1992

Attest:

DOUGLAS B. COMER

Attesting Officer

Acting Commissioner of Patents and Trademarks